(12) United States Patent
Polyakov et al.

(10) Patent No.: US 8,739,287 B1
(45) Date of Patent: May 27, 2014

(54) DETERMINING A SECURITY STATUS OF POTENTIALLY MALICIOUS FILES

(71) Applicant: Kaspersky Lab ZAO, Moscow (RU)

(72) Inventors: Alexey A. Polyakov, Moscow (RU); Konstantin V. Sapronov, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 14/050,851

(22) Filed: Oct. 10, 2013

(51) Int. Cl.
*G06F 12/14* (2006.01)
*G06F 21/56* (2013.01)
*G06F 21/57* (2013.01)

(52) U.S. Cl.
CPC ............. *G06F 21/56* (2013.01); *G06F 21/561* (2013.01); *G06F 21/562* (2013.01); *G06F 21/563* (2013.01); *G06F 21/564* (2013.01); *G06F 21/565* (2013.01); *G06F 21/566* (2013.01); *G06F 21/567* (2013.01); *G06F 21/568* (2013.01); *G06F 21/57* (2013.01)
USPC .................... 726/24; 726/22; 726/23; 726/25

(58) Field of Classification Search
CPC combination set(s) only.
See application file for complete search history.

(56) References Cited

U.S. PATENT DOCUMENTS

| | | | |
|---|---|---|---|
| 6,732,279 B2 * | 5/2004 | Hoffman | 726/24 |
| 7,496,960 B1 * | 2/2009 | Chen et al. | 726/22 |
| 8,180,917 B1 * | 5/2012 | Yan et al. | 709/234 |
| 8,214,977 B2 * | 7/2012 | Szor | 26/24 |
| 8,584,194 B1 * | 11/2013 | Kerr et al. | 726/1 |
| 2004/0025016 A1 * | 2/2004 | Focke et al. | 713/164 |
| 2007/0162975 A1 * | 7/2007 | Overton et al. | 726/24 |
| 2009/0293125 A1 * | 11/2009 | Szor | 726/24 |
| 2009/0300761 A1 * | 12/2009 | Park et al. | 726/23 |
| 2011/0219451 A1 * | 9/2011 | Mcdougal et al. | 726/23 |
| 2012/0017275 A1 * | 1/2012 | Harmonen | 726/24 |
| 2012/0023579 A1 * | 1/2012 | Zaitsev et al. | 726/23 |
| 2012/0173609 A1 * | 7/2012 | Kulaga et al. | 709/203 |
| 2012/0210431 A1 * | 8/2012 | Stahlberg et al. | 726/24 |

* cited by examiner

*Primary Examiner* — Peter Poltorak
(74) *Attorney, Agent, or Firm* — Arent Fox LLP; Michael Fainberg

(57) ABSTRACT

A server system that includes one or more processors and memory receives, from a client, metadata for a plurality of suspicious files for which the client was unable to conclusively determine a security status. The server system also analyzes the metadata using threat-identification information to identify potentially malicious files and requests authorization to receive the potentially malicious files from the client. In response to the request, upon authorization for the server system to receive the potentially malicious files, the server system automatically receives one or more potentially malicious files from the client that were authorized based on a confidentiality level of the potentially malicious files. After receiving the one or more potentially malicious files, the server system analyzes the potentially malicious files using threat-identification information available at the server system and provides, to the client, an indication of the security status of the one or more potentially malicious files.

20 Claims, 7 Drawing Sheets

DETERMINING A SECURITY STATUS OF POTENTIALLY MALICIOUS FILES

FIELD OF THE INVENTION

The present invention relates generally to the field of computer security, and in particular, to a system and method for efficiently determining a security status of potentially malicious files.

BACKGROUND OF THE INVENTION

Malware such as viruses, worms and Trojans, have become the principle threat to the normal functioning of computers and to the information stored in them. The scope and range of malicious software is constantly expanding, presenting an ever-growing security challenge. Malicious programs are also making use of new methods to penetrate computer systems, concealing their activities and bypassing detection by security software. No conventional malware detection method can now provide complete protection when used as a stand-alone tool.

SUMMARY

Malware signature detection, sometimes called blacklisting, is not able to detect new, previously unknown malware, which makes it an inefficient malware detection tool due to the constant mutation of threats. Such systems also take a long time to detect threats, because information on the malware is not necessarily provided to the antivirus vendor immediately after the computer is infected. Heuristic malware detection is capable of detecting new malware but, in some circumstances, fails to ensure sufficient detection levels and often has a long response time due to complicated system set-up processes. Whitelisting based on identifying legitimate applications rather than malware, prevents the user's system from executing all programs and categorizes unknown programs either as malicious or safe. This approach also has its limitations, primarily due to the difficulty of whitelisting legitimate applications given their number and the constant release of new versions. The problems with these and other approaches to computer security are reduced or eliminated by the systems and methods described below.

Today's computer system requires a new and integrated approach to ensure computer security. The systems and methods described herein combine the advantages and minimize the deficiencies of traditional methods of combating malicious software. The systems and methods described herein also harness the potential of global monitoring and automatic updating to respond to new threats. Thus, in some embodiments, a method is performed at a server system having one or more processors and memory storing one or more programs for execution by the one or more processors so as to perform the method. The method includes receiving, from a client, metadata for a plurality of suspicious files detected at the client, where the suspicious files are files for which the client was unable to conclusively determine a security status. The method further includes analyzing the metadata using threat-identification information, identifying a subset of the suspicious files as potentially malicious files based on the results of the analysis, and requesting authorization to receive the potentially malicious files from the client. The method also includes, in response to the request, and upon authorization for the server system to receive the potentially malicious files from the client, automatically receiving one or more potentially malicious files from the client. Transmission of the one or more potentially malicious files from the client to the server system was authorized based on a confidentiality level of the potentially malicious files. The method further includes, after receiving the one or more potentially malicious files: analyzing the potentially malicious files using threat-identification information available at the server system and providing, to the client, an indication of the security status of the one or more potentially malicious files based on the analysis of the potentially malicious files. The method described above provides the client with access to the most up-to-date threat identification capabilities by providing a simple and efficient way to communicate information about potentially malicious files to a server system and receive analysis of the potentially malicious files from the server system. The method described above provides access to the most up-to-date threat identification capabilities while preserving the confidentiality of sensitive materials by explicitly requesting authorization from the client before accessing files from the client.

In accordance with some embodiments, a computer system (e.g., a client system or server system) includes one or more processors, memory, and one or more programs; the one or more programs are stored in the memory and configured to be executed by the one or more processors and the one or more programs include instructions for performing the operations of the method described above. In accordance with some embodiments, a non-transitory computer readable storage medium has stored therein instructions which when executed by one or more processors, cause a computer system (e.g., a client system or server system) to perform the operations of the methods described above.

BRIEF DESCRIPTION OF THE DRAWINGS

For a better understanding of the disclosed embodiments, reference should be made to the Description of Embodiments below, in conjunction with the following drawings in which like reference numerals refer to corresponding parts throughout the figures.

DESCRIPTION OF EMBODIMENTS

Figure 1:
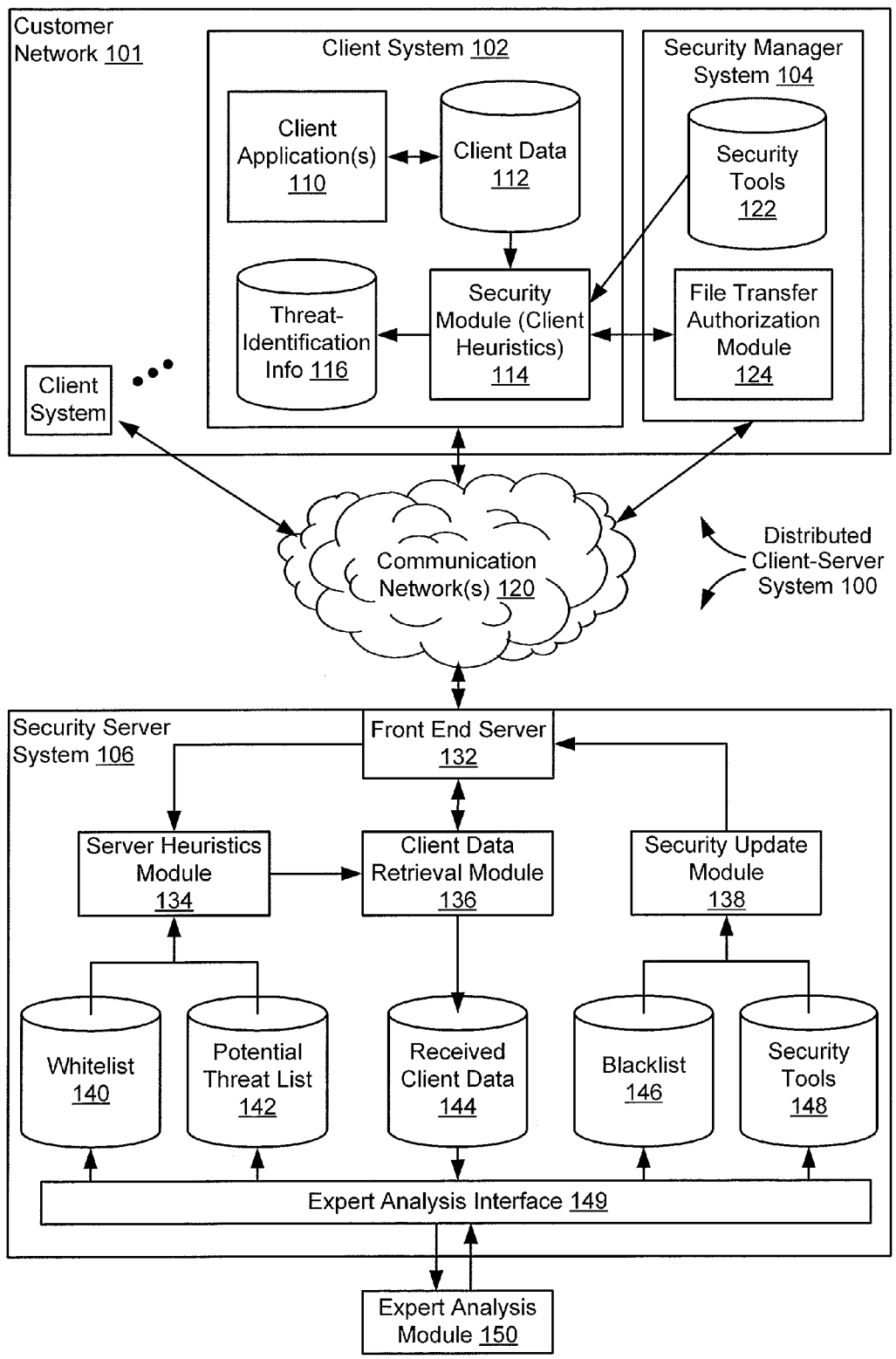
FIG. 1 is a block diagram illustrating a distributed client-server system, in accordance with some embodiments.

The present invention is generally to the field of computer security, and in particular, to a system and method for efficiently determining a security status of potentially malicious files. FIG. 1 includes a block diagram illustrating an exemplary distributed Client-Server System 100 for efficiently determining a security status of potentially malicious files. System 100 includes a Customer Network 101 with one or more client systems (e.g., Client System 102) and one or more Security Manager Systems 104 and a Security Server System 106 for analyzing potentially malicious files. A Communication Network 120 connects Client System 102 and Security Manager System 104 to Security Server System 106. Communication Network 120 optionally includes the Internet, one or more local area networks (LANs), one or more wide area networks (WANs), other types of networks, or a combination of such networks.

Client System 102 optionally includes at least one client application 110, client data 112, a security module 114 with one or more client heuristics, and Threat-Identification Information 116. Client Application 110 accesses, stores, and generates Client Data 112 which optionally includes executable files and other files. In some circumstances Client Data 112 will include malicious or potentially malicious files (e.g., where those files are generated or downloaded by one of Client Applications 110). Security Module 114 analyzes Client Data 112 to determine a security status of Client Data 112 (e.g., monitoring client data for malicious or potentially malicious files), optionally using one or more threat identification heuristics. Information about suspicious files is stored as Threat-Identification Information 116, which includes information identifying suspicious files (e.g., a hash or unique identifier) and, optionally, metadata related to the suspicious files. Threat-Identification Information 116 is stored at Client System 102 for delivery to Security Sever System 106 for further analysis of the suspicious files.

Security Manager System 104 manages security for Customer Network 101 by providing Security Tools 122 (e.g., whitelists, blacklists and other security tools and client heuristics for identifying suspicious and potentially malicious files) to Client System(s) 102. In some embodiments Security Manager System 104 periodically receives updates to Security Tools 122 from Security Server System 106. Additionally Security Manager System 104 enables authorization (e.g., automatically authorizes or provides an interface for security personnel associated with Customer Network 101 to authorize) delivery of potentially malicious files to Security Server System 106. In some embodiments, Security Manager System 104 provides the potentially malicious files to Security Server System 106. In some embodiments, Security Manager System 104 provides authorization for Client System 102 or Security Module 114 to provide the potentially malicious files to Security Server System 106.

Security Server System 106 includes Front End Server 132, Server Heuristics Module 134, Client Data Retrieval Module 136, Security Update Module 138, Whitelist 140, Potential Threat List 142, Received Client Data 144, Blacklist 146, and Security Tools 148. Front End Server 132 receives requests from Customer Network 101 (e.g., from Client System 102 and Security Manager System 104) and relays these requests to various servers or modules within Security Server System 106. Front End Server 132 also provides Customer Network 101 (e.g., from Client System 102 and Security Manager System 104) with responses from various modules and servers within Security Server System 106. When Front End Server 132 receives threat-identification information from Client System 102 (e.g., identifiers and, optionally, metadata for suspicious files), Front End Server 132 passes the threat-identification information to Server Heuristics Module 134, which applies different heuristics than the client heuristics that are applied at Security Module 114. Server Heuristics Module 134 compares the threat-identification information to Whitelist 140 and Potential Threat List 142 and optionally performs other server heuristics to identify potentially malicious files and passes the information identifying the potentially malicious files to Client Data Retrieval Module 136, which requests (via Front End Server 132) the potentially malicious files received from Client System 102. File Transfer Authorization Module 124 at Security System Manager 104, optionally, authorizes delivery of one or more of the potentially malicious files to Security Server System 106 for further analysis.

When Front End Server 132 receives the potentially malicious files, the files are stored, at least temporarily as Received Client Data 144. The received client data (e.g., potentially malicious files and optionally metadata about the potentially malicious files) is transmitted to Expert Analysis Module 150 via Expert Analysis Interface 149 and is analyzed at Expert Analysis Module 150 (e.g., an automated security analysis program running at Security Server System 106 and/or human security experts) and the results of the analysis of the potentially malicious files by Expert Analysis Module 150 (e.g., results received via Expert Analysis Interface 149) are used to update security information at Security Server System 106 (e.g., Whitelist 140, Potential Threat List 142, Blacklist 146, and/or Security Tools 148). Security Update Module 138 retrieves Blacklist 146 and Security Tools 148 and provides the updated Blacklist 146 and Security Tools 148 to Customer Network (e.g., Client System 102 and/or Security System Manager). The updated blacklist and security tools provided by Security Server System 106 are used by Security Manager System 104 and Client System 102 to remove or quarantine malicious files, identify other suspicious and potentially malicious files, and prevent malicious files from spreading to other computer systems.

Figure 2:
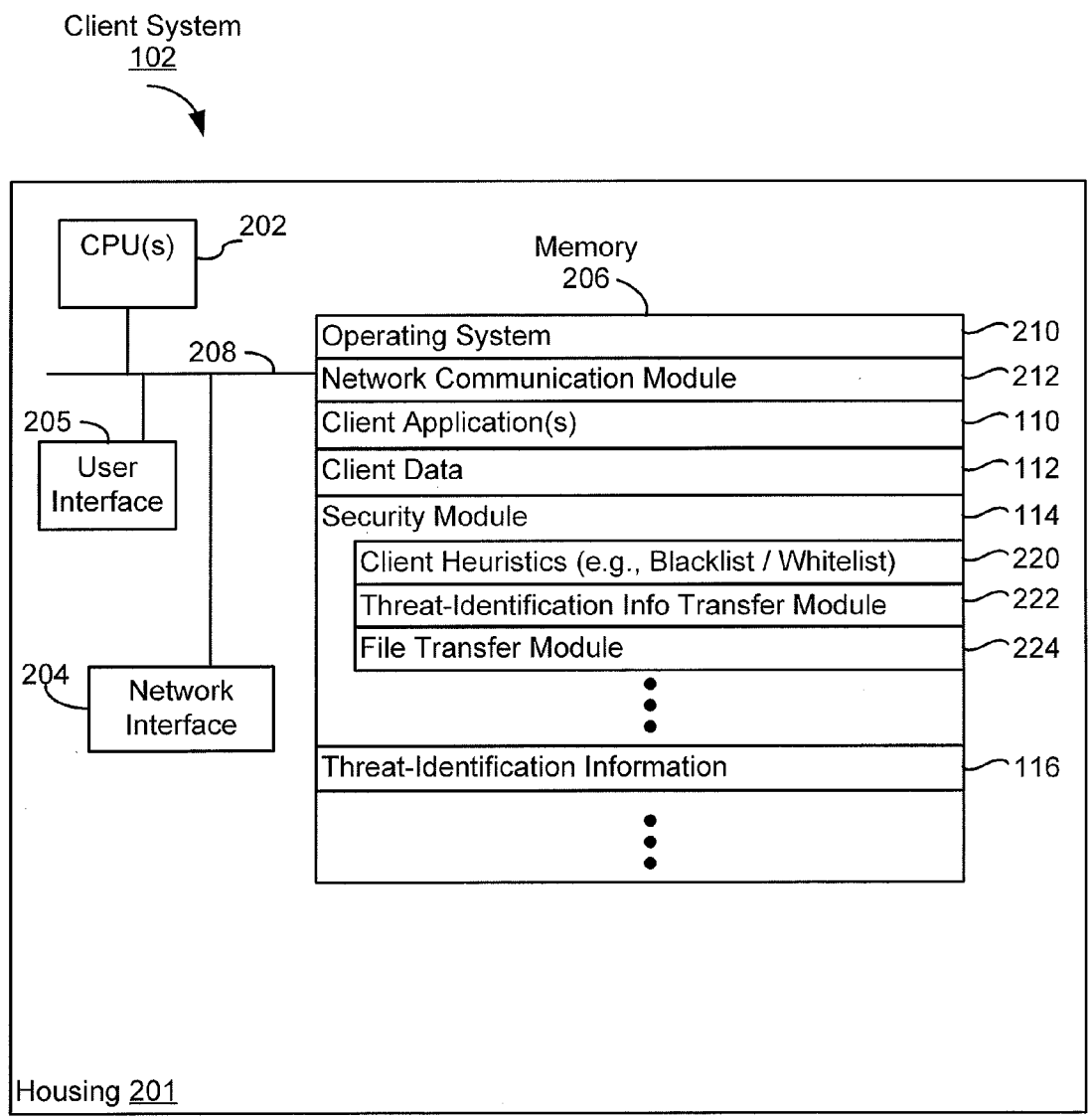
FIG. 2 is a block diagram illustrating a client system, in accordance with some embodiments.

FIG. 2 is a block diagram illustrating a Client System 102 in accordance with some embodiments. Client System 102 optionally includes Housing 201 and typically includes one or more processing units CPU(s) 202, one or more network or other Communication Interfaces 204, Memory 206, User Interface 205 comprising a display device and a keyboard, mouse, touchpad, touchscreen or other input device, and one or more Communication Buses 208 for interconnecting these components. Memory 206 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 206 optionally includes one or more storage devices remotely located from CPU(s) 202. Memory 206, or alternatively the non-volatile memory device(s) within Memory 206, comprises a non-transitory computer readable storage medium. In some embodiments, Memory 206 or alternatively the non-transitory computer readable storage medium stores the following programs, modules and data structures, or a subset thereof:

- Operating System 210 that includes procedures for handling various basic system services and for performing hardware dependent tasks;
- Network Communication Module (or instructions) 212, for connecting Client System 102 to other computers (e.g., Security Server System 106 and Security Manager System 104) via one or more Network Interfaces 204 (wired or wireless) and one or more Communication Networks 120 (FIG. 1), such as the Internet, other wide area networks, local area networks, metropolitan area networks, and so on;
- Client Application(s) 110, for performing user-specified operations at Client System 102 and accessing, storing, and generating Client Data 112;
- Security Module 114, for monitoring Client Data 112 and Client Applications 110 for suspicious activity or suspicious files, including:

Client Heuristics 220, such as blacklist(s), whitelist(s) and/or programmatic heuristics for identifying suspicious files and activity;

Threat-Identification Information Transfer Module 222 for transferring threat-identification information to Security Server System 106 and Security Manager System 104; and File Transfer Module 224 for transferring potentially malicious files to Security Server System 106 for further analysis to determine whether the potentially malicious files are malicious; and Threat-Identification Information 116, including information identifying suspicious files (e.g., a hash or unique identifier) and, optionally, metadata related to the suspicious files (e.g., information identifying a timestamp, creator and/or source of the suspicious file as recorded by Client 102) that can be provided to Security Server System 106 for further analysis to determine whether any of the suspicious files are potentially malicious files.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, Memory 206 optionally stores a subset of the modules and data structures identified above. Furthermore, Memory 206 optionally stores additional modules and data structures not described above.

Figure 3:
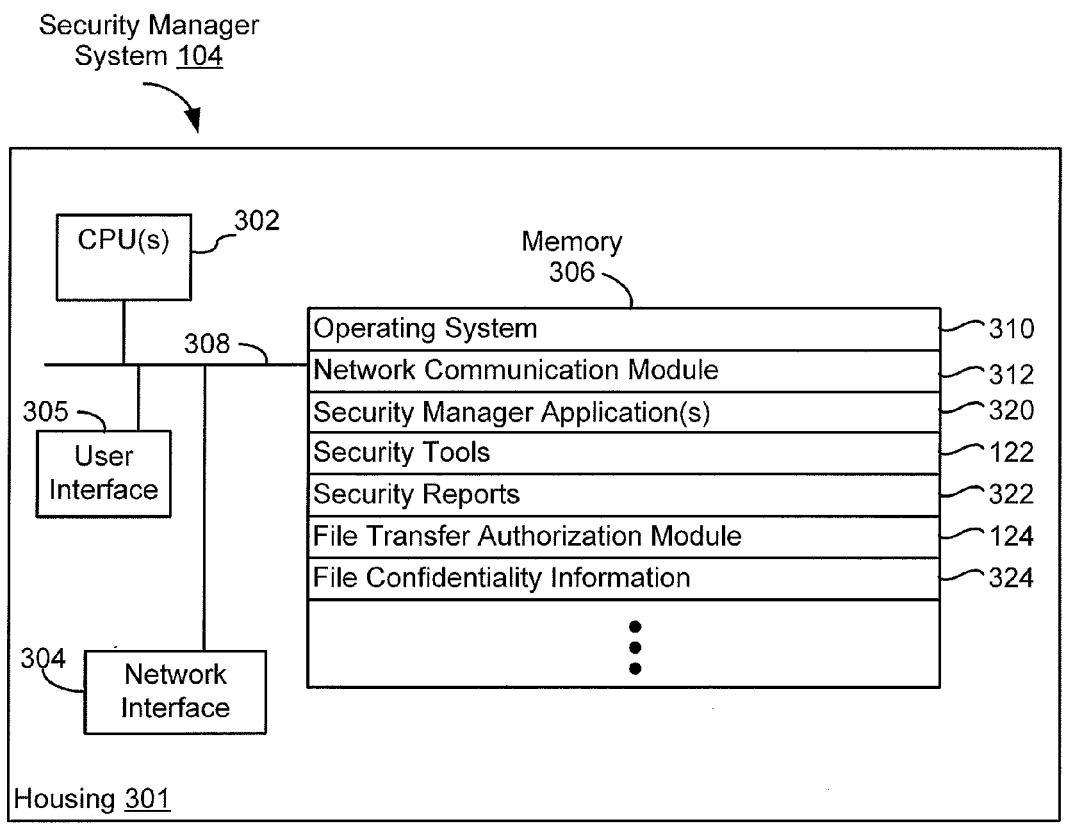
FIG. 3 is a block diagram illustrating a security manager system, in accordance with some embodiments.

FIG. 3 is a block diagram illustrating a Security Manager System 104 in accordance with some embodiments. Security Manager System 104 optionally includes Housing 301 and typically includes one or more processing units CPU(s) 302, one or more network or other Communication Interfaces 304, Memory 306, User Interface 305 comprising a display device and a keyboard, mouse, touchpad, touchscreen or other input device, and one or more Communication Buses 308 for interconnecting these components. Memory 306 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 306 optionally includes one or more storage devices remotely located from the CPU(s) 302. Memory 306, or alternatively the non-volatile memory device(s) within Memory 306, comprises a non-transitory computer readable storage medium. In some embodiments, Memory 306 or alternatively the non-transitory computer readable storage medium stores the following programs, modules and data structures, or a subset thereof:

Operating System 310 that includes procedures for handling various basic system services and for performing hardware dependent tasks;

Network Communication Module (or instructions) 312, for connecting Security Manager System 104 to other computers (e.g., Security Server System 106 and Client System 102) via one or more Network Interfaces 304 (wired or wireless) and one or more Communication Networks 120 (FIG. 1), such as the Internet, other wide area networks, local area networks, metropolitan area networks, and so on;

Security Manager Application(s) 320, for managing security settings and monitoring security of Customer Network 101 and clients in Customer Network 101 and for determining (e.g., automatically or based on input from security personnel associated with Customer Network 101) whether or not to authorize the transfer of potentially malicious files to Security Server System 106 for further analysis;

Security Tools 122, such as whitelist(s), blacklist(s) and other security tools and client heuristics for identifying suspicious and potentially malicious files and other network-wide tools for analyzing suspicious activity and providing updated client heuristics to clients in Customer Network 101;

Security Reports 322, including information about security issues (e.g., patterns of identified malicious files and potentially malicious files sent to Security Server System 106 for analysis);

File Transfer Authorization Module 124, for providing authorization to Client System 102 to provide potentially malicious files to Server System 106 for further analysis; and File Confidentiality Information 324, for use in determining whether confidential information from Customer Network 101 is likely to be compromised by transmitting any of the potentially malicious files to Security Server System 106.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, Memory 306 optionally stores a subset of the modules and data structures identified above. Furthermore, Memory 306 optionally stores additional modules and data structures not described above.

Figure 4:
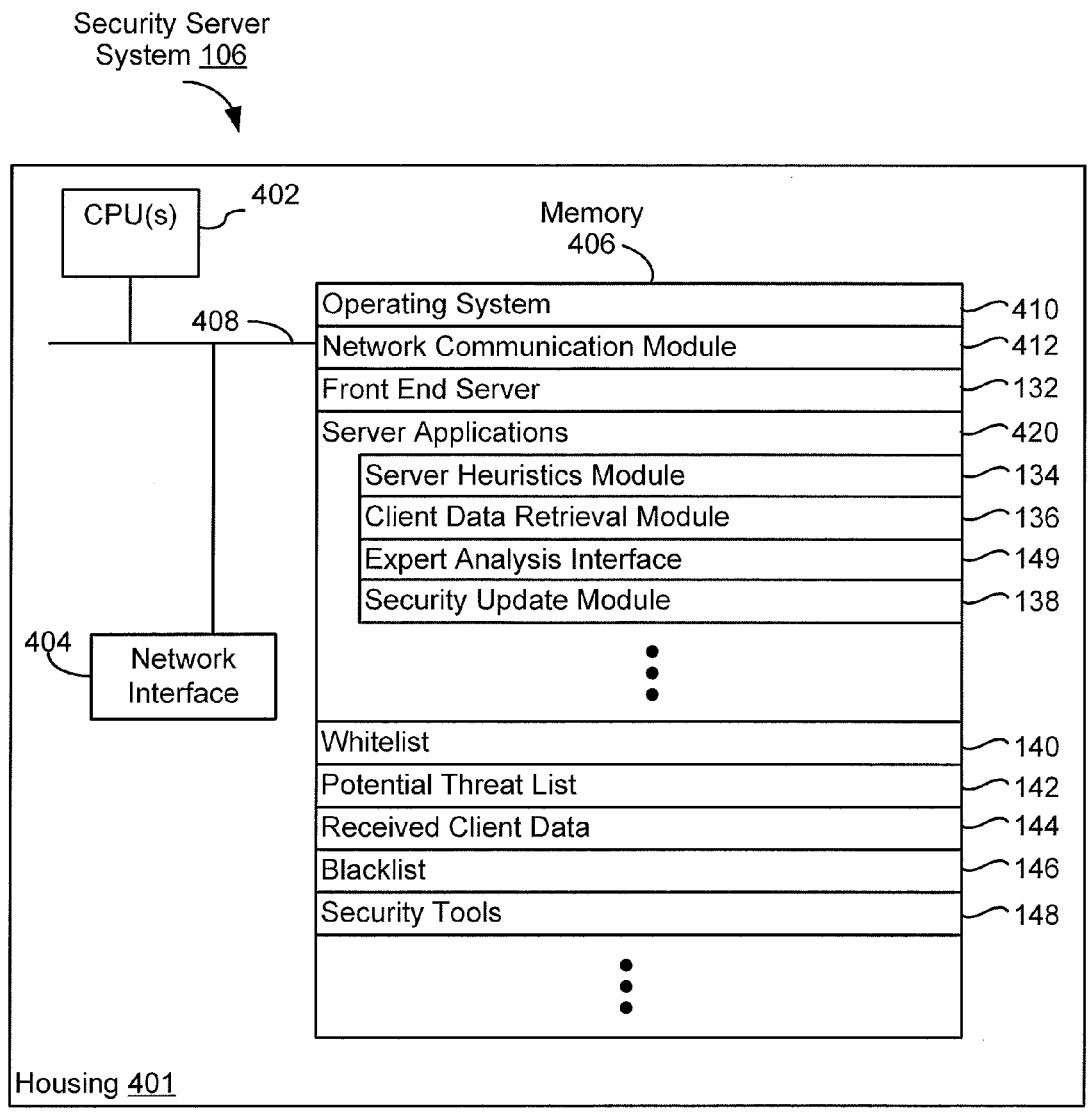
FIG. 4 is a block diagram illustrating a server system, in accordance with some embodiments.

FIG. 4 is a block diagram illustrating a Security Server System 106 in accordance with some embodiments. Security Server System 106 optionally includes Housing 401 and typically includes one or more processing units CPU(s) 402, one or more network or other Communications Interfaces 412, Memory 406, and one or more Communication Buses 408 for interconnecting these components. Memory 406 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 406 optionally includes one or more storage devices remotely located from the CPU(s) 402. Memory 406, or alternatively the non-volatile memory device(s) within Memory 406, comprises a non-transitory computer readable storage medium. In some embodiments, Memory 406 or alternatively the non-transitory computer readable storage medium stores the following programs, modules and data structures, or a subset thereof:

Operating System 410 that includes procedures for handling various basic system services and for performing hardware dependent tasks;

Network Communication Module (or instructions) 412, for connecting Security Server System 106 to other computers (e.g., Client System 102 and Security Manager System 104) via one or more Network Interfaces 404 (wired or wireless) and one or more Communication Networks 120 (FIG. 1), such as the Internet, other wide area networks, local area networks, metropolitan area networks, and so on;

Front End Server 132 for coordinating communication between Security Server System 106, Client System 102 and any other computer systems with which Security Server System 106 communicates;

Server Applications 420, including:

Server Heuristics Module 134, for applying server heuristics to threat-identification information received from Client Systems 102 to identify potentially malicious files by analyzing a file's similarity to known malicious files, analyzing the results of execution of the file on a virtual machine, and/or analyzing the response of existing third party antivirus products to the file;

Client Data Retrieval Module 136 for requesting potentially malicious files identified by Server Heuristics Module 134 from Client System 102;

Expert Analysis Interface 149, for enabling expert security analysts to analyze potentially malicious files and update security information at Security Server System 106 (e.g., Whitelist 140, Potential Threat List 142, Blacklist 146, and/or Security Tools 148); and Security Update Module 138 for providing updated security information (e.g., Whitelist 140, Potential Threat List 142, Blacklist 146, and/or Security Tools 148) to Customer Network 101 (e.g., Client System 102 and Security Manager System 104);

Whitelist 140, including information (e.g., hashes or unique identifiers) for identifying one or more files that are known to be safe and are not malicious;

Potential Threat List 142, including information (e.g., hashes or unique identifiers) for identifying one or more potentially malicious files that are not known to be safe and are also not known to be malicious;

Received Client Data 144, for storing data received from client systems, including threat-identification information and potentially malicious files;

Blacklist 146, including information (e.g., hashes, unique identifiers, or malware definitions/signatures) for identifying one or more files that are known to be malicious; and Security Tools 148, including security programs for use by Security Manager System 104 and Client System 102 to remove or quarantine malicious files, identify other suspicious and potentially malicious files, and prevent malicious files from spreading to other computer systems.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, Memory 406 optionally stores a subset of the modules and data structures identified above. Furthermore, Memory 406 optionally stores additional modules and data structures not described above.

Although FIG. 4 shows a "Security Server System" 106 FIG. 4 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 4 could be implemented on single servers and single items could be implemented by one or more servers. The actual number of servers used to implement Security Server System 106 and how features are allocated among them will vary from one implementation to another, and optionally depends in part on the amount of data traffic that the system must handle during peak usage periods as well as during average usage periods.

Figure 5:
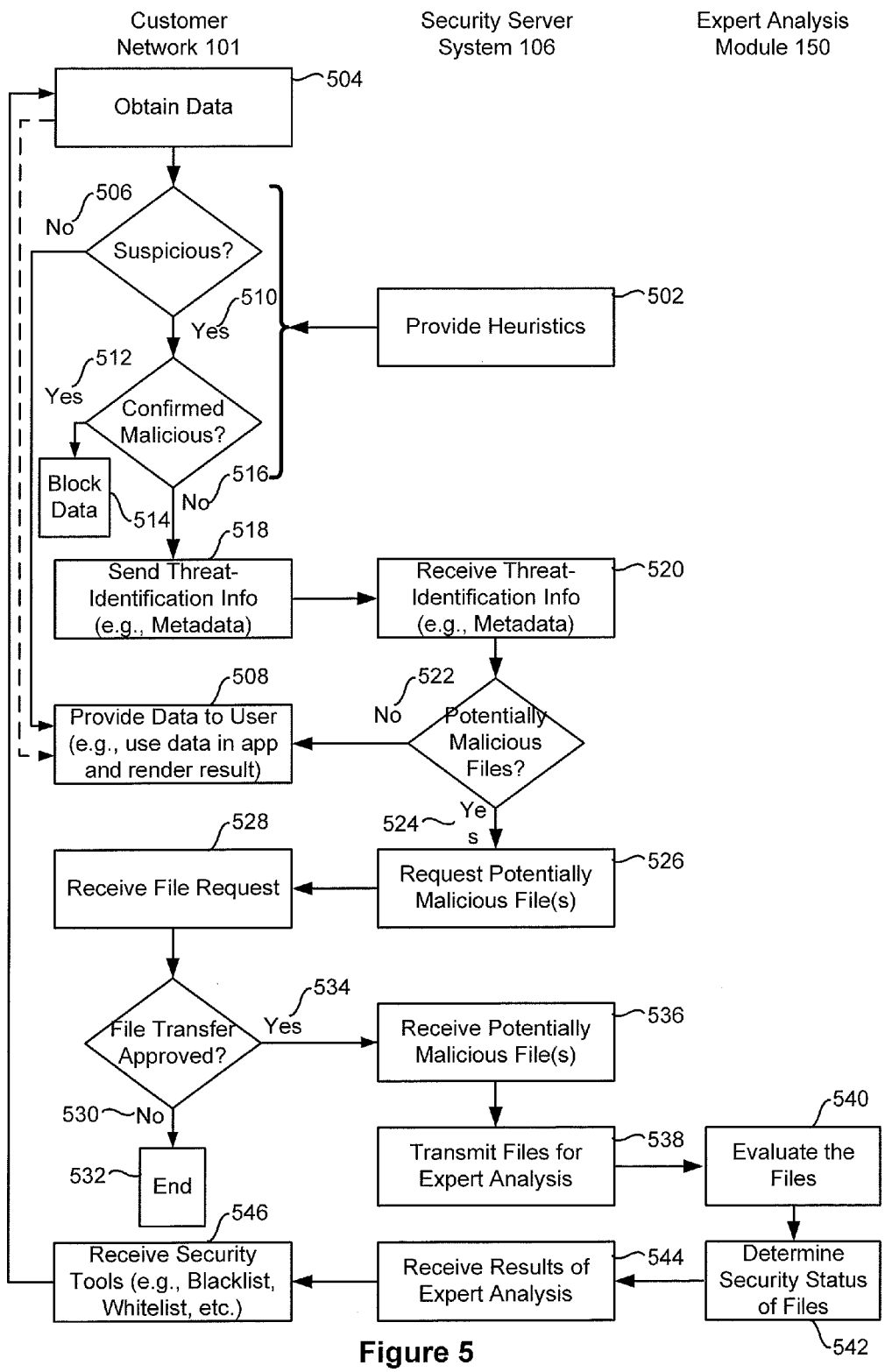
FIG. 5 is a flow chart illustrating communications between a client system and server system when determining a security status of data obtained by a customer network, in accordance with some embodiments.

FIG. 5 shows a flowchart representing communications between Customer Network 101 and Security Server System 106 when determining a security status of potentially malicious files, according to certain embodiments. Security Server System 106 optionally provides (502) client heuristics to Customer Network 101 (e.g., Client System 102 and/or Security Manager System 104) for use in identifying suspicious files. In some embodiments, the client heuristics are simpler and less computationally intensive than server heuristics that are executed by Security Server System 106, so as to reduce resource usage and improve performance at Customer Network 101. After receiving the client heuristics, a client at Customer Network 101 obtains (504) data (e.g., data received or downloaded from an external source or data generated by an application running on a computer within Customer Network 101). Using client heuristics, the client at Customer Network 101 determines whether the data is suspicious (e.g., whether the data matches a whitelist of safe files) and when the data is not (506) suspicious (e.g., the data is matches the whitelist), the client provides (508) the data to a user of the client (e.g., by executing an application that uses the data to generate an output for display to a user and renders the output on a display that is in communication with Client System 102).

In some embodiments, after the data is obtained by Customer Network 101 (e.g., as shown in operation 504), it is provided (508) to the user without regard to whether or not the data is determined to be suspicious. In some embodiments, the determination of the security status of the obtained data is performed asynchronously (e.g., the obtained data is provided to the user so that the user can use the data without delay while the Customer Network 101 and Security Sever System 106 determine the security status of the obtained data). In some embodiments, if data that is determined to be suspicious or malicious has been provided to the user, the user is alerted (e.g., via a message at Client System 102) that the data is suspicious or malicious (depending on the determination). In some embodiments, if data that has been provided to the user is later determined to be suspicious or malicious, the data is quarantined or deleted in response to the determination that the data is suspicious or malicious (depending on the determination). For example, if data is determined to be suspicious, the suspicious data is quarantined pending further analysis of the suspicious data; and/or if data is determined to be malicious, the malicious data is deleted.

However, if the data is (510) suspicious (e.g., the data is does not match the whitelist) the client determines (e.g., using Security Module 114 in FIGS. 1 and 2), based on the client heuristics whether the data is confirmed malicious data (e.g., whether the data matches a blacklist of malicious files), and when the data is (512) is confirmed to be malicious (e.g., the data matches the blacklist of malicious files), the client blocks (514) a user of the client from accessing the data (e.g., by deleting or quarantining the data). However, if the data is suspicious but is not (516) confirmed to be malicious (e.g., the data does not match a whitelist but is not on a blacklist), the client collects threat-identification information (e.g., a hash or identifier for the data and, optionally, relevant metadata such as a date of creation or a source/creator of the data). In some embodiments, the threat-identification information is selected so as to exclude potentially confidential information (e.g., no information about the contents of the suspicious data is included in the threat-identification information, so that companies with potentially confidential information will be able to use capabilities of the Security Server System to analyze suspicious data without being concerned about the leakage of confidential information outside of Customer Network 101). After analyzing the security status of the received data using client heuristics, Customer Network (e.g., Client System 102 or Security Manger System 104) sends (518) the threat-identification information to Security Server System 106 for further analysis.

Security Server System 106 receives (520) the threat-identification from Customer Network 101 and analyzes the threat-identification information using server heuristics (e.g., using Server Heuristics Module 134) to determine whether the suspicious data includes any potentially malicious files. In some embodiments, the server heuristics are more computationally intensive and/or include private information that is maintained by the Security Server System 106. Using private heuristic information that is not shared with clients enables Security Server System 106 to avoid inadvertently sharing advanced heuristic information with potential creators of malicious files, because Security Server System 106 can use the private heuristic information to improve the detection of malicious files at clients without making the private heuristic information publicly available.

If the suspicious data does not (522) include any potentially malicious files, Security Server System 106 informs Customer Network 101 (e.g., Client System 102 or Security Manager System 104) that the suspicious data is not potentially malicious and the suspicious data is provided (508) to the user and, optionally, marked as being safe data (e.g., added to a whitelist). However, in accordance with a determination that the suspicious data does (524) include one or more potentially malicious files, Security Server System requests (526) the one or more potentially malicious files from the Customer Network 101. Customer Network 101 receives (528) the request for the potentially malicious files and determines whether or not to approve transfer of the requested files to Security Server System 106. In some embodiments, an automatic process approves the transfer of files to the Security Server System 106 based on predefined criteria (e.g., whether the files are marked as confidential, include particular keywords that related to confidential information, or are stored in areas of the Customer Network 101 that include confidential information such as personnel records, financial records or new product development). In some embodiments, security personnel or system administrators at Customer Network 101 manually approve individual files or manually confirm automatic determinations as to the confidentiality of the requested files.

If the requested files are not (530) approved for transfer, the requested files are not transferred to Security Server System 106 for further analysis and are optionally quarantined or further analyzed at Customer Network 101, or the process of determining a security status of the received data ends (532). However, if the requested files are (534) approved for transfer to Security Server System 106, the requested files are transmitted to Security Server System 106 for further analysis and are received (536) by Security Server System 106. After receiving the requested potentially malicious files, Security Server System 106 performs additional analysis on the potentially malicious files, including transmitting (538) the files to expert security analysts for analysis (e.g., via Expert Analysis Interface 129 in FIGS. 1 and 4). At Expert Analysis Module 150, an automated security analysis program (e.g., a program running at Security Server System 106), a human security expert (e.g., using a computer that is part of Security Server System 106 or a separate computer that is in communication with Security Server System 106), or both, evaluate (540) the potentially malicious files and determine (542) a security status of the potentially malicious files (e.g., by determining that one or more of the potentially malicious files are verified to be malicious and/or by determining that one or more of the potentially malicious files are verified to be safe or non-malicious).

Security Server System 106 receives (544) the results of the expert analysis from Expert Analysis Module 150 (e.g., via Expert Analysis Interface 129 in FIGS. 1 and 4) and generates or updates security tools and provides the security tools to Customer Network 101 for use in blocking and removing malicious files from Customer Network 101. These security tools optionally include updates to some of the client heuristics that were provided to Customer Network in step 502. Customer Network 101 receives (546) the security tools and applies the security tools to data that is obtained by Customer Network 101 in the future.

Figure 6A:
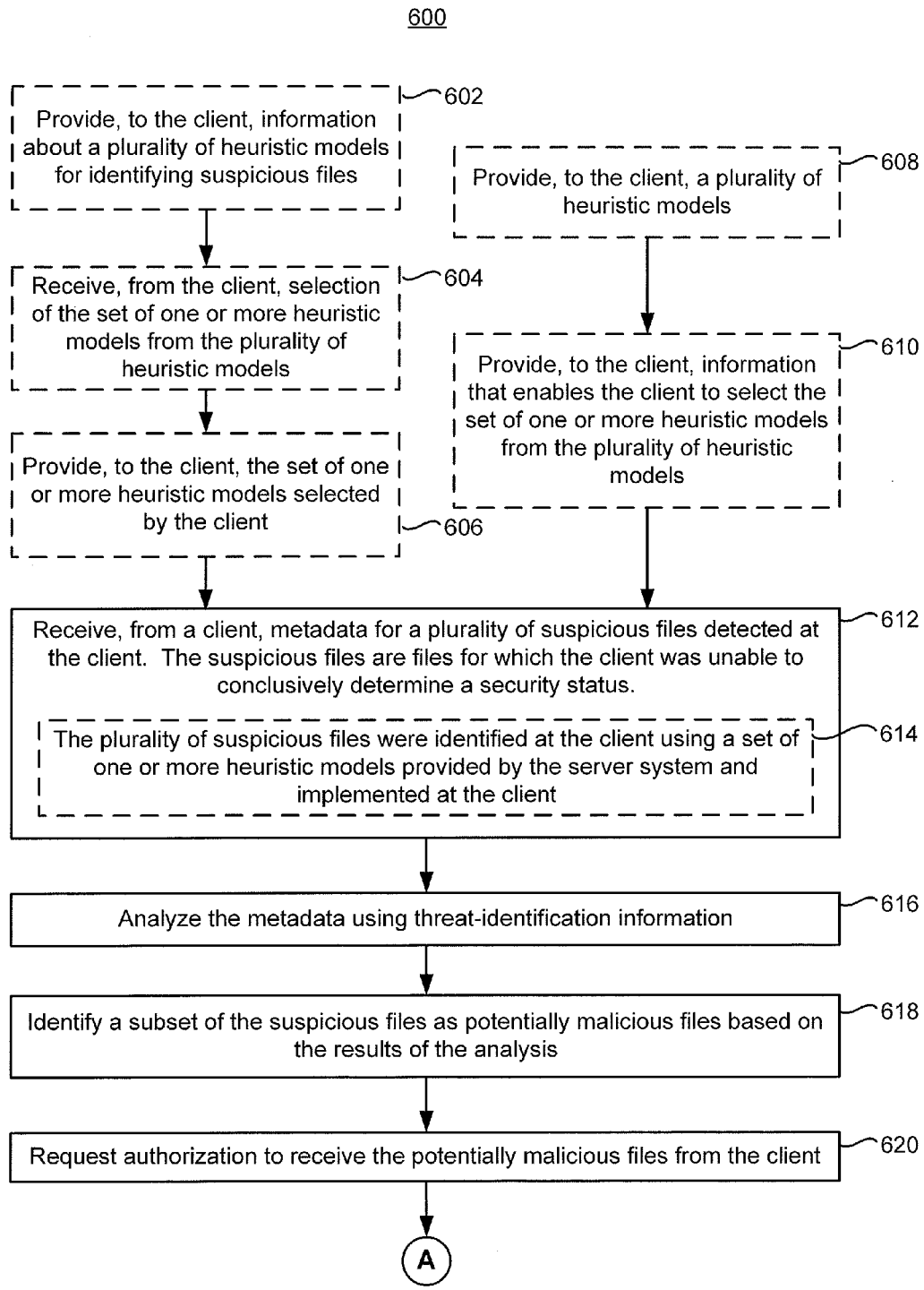
FIGS. 6A-6B include a flow chart illustrating a method for determining a security status of potentially malicious files, in accordance with some embodiments.
Figure 6B:
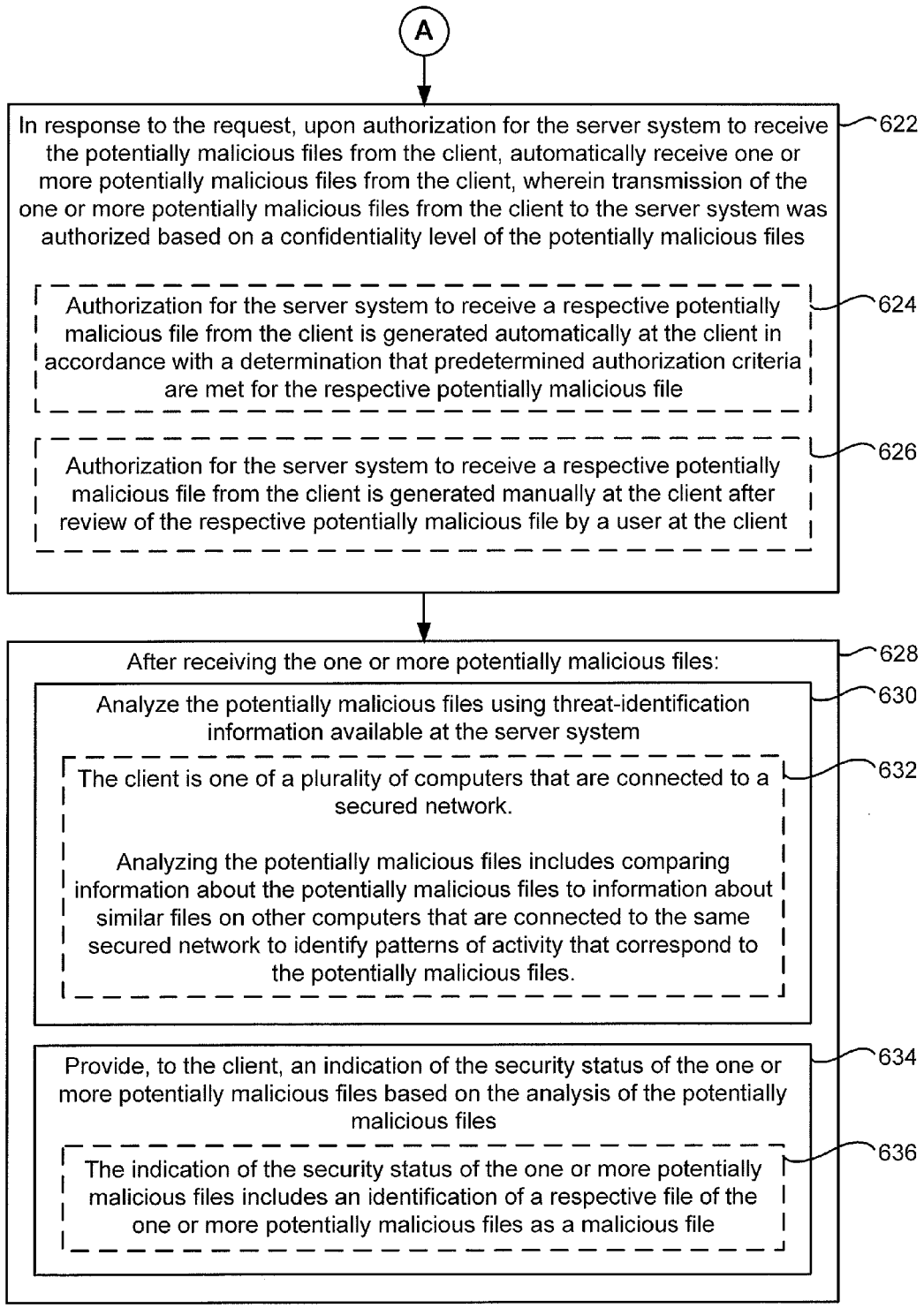

FIGS. 6A-6B include a flowchart representing a method 600 for efficiently determining a security status of potentially malicious files, according to certain embodiments. In particular, method 600 describes in greater detail operations performed at Security Server System 106 (e.g., operations 502, 520, 522, 524, 526, 536, 538, and/or 544, and, optionally, operations 540 and 542), as discussed above in FIG. 5. Method 600 is, optionally, governed by instructions that are stored in a non-transitory computer readable storage medium and that are executed by one or more processors of one or more servers (e.g., Server 106, FIG. 4). Each of the operations shown in FIGS. 6A-6B optionally corresponds to instructions stored in a computer memory or computer readable storage medium (e.g., memory 406 of Server 106 in FIG. 4). The computer readable storage medium optionally include a magnetic or optical disk storage device, solid state storage devices such as Flash memory, or other non-volatile memory device or devices. The computer readable instructions stored on the computer readable storage medium optionally include one or more of: source code, assembly language code, object code, or other instruction format that is interpreted by one or more processors. Some operations in method 600 are, optionally, combined and/or the order of some operations are, optionally, changed.

In some embodiments, a server system (e.g., Security Server System 106 in FIGS. 1 and 4) provides (602), to the client (e.g., Client System 102 in FIGS. 1 and 2), information about a plurality of heuristic models for identifying suspicious files, receives (604), from the client, selection of the set of one or more heuristic models from the plurality of heuristic models and server system (e.g., Security Update Module 138 in FIGS. 1 and 4) provides (606), to the client, the set of one or more heuristic models selected by the client. For example, the client is provided (e.g., by the server system) with a description of a large number of possible heuristic models and upon receiving a selection of a subset of the heuristic models from the client, the server system provides the selected set of heuristic models to the client for user in identifying suspicious files. In some embodiments, the server system provides (608), to the client, a plurality of heuristic models; and the server system (e.g., Security Update Module 138 in FIGS. 1 and 4) provides (610), to the client, information that enables the client to select the set of one or more heuristic models from the plurality of heuristic models. For example, the client is provided (e.g., by the server system) with a large number of possible heuristic models and is given the option to select a subset of the plurality of heuristic models and use only those heuristic models that the client has selected to identify suspicious files).

The server system (e.g., with Front End Server 132 in FIGS. 1 and 4) receives (612), from a client, metadata for a plurality of suspicious files detected at the client, where the suspicious files are files for which the client was unable to conclusively determine a security status. In some embodiments, the client was unable to identify the files as safe files or malicious files (e.g., the suspicious files are files that are not on a whitelist or a blacklist that is stored at the client). In some embodiments, the plurality of suspicious files were identified (614) at the client using a set of one or more heuristic models provided by the server system and implemented at the client.

The server system (e.g., with Server Heuristics Module 134 in FIGS. 1 and 4) analyzes (616) the metadata using threat-identification information. In some embodiments, the threat-identification information is not available at the client (e.g., the threat-identification information private virus definitions or heuristics that are too computationally intensive to run at the client computer without substantial negative impacts on user experience). After analyzing the metadata, the server system identifies (618) a subset of the suspicious files as potentially malicious files based on the results of the analysis and the server system (e.g., with Client Data Retrieval Module 136) requests (620) authorization to receive the potentially malicious files from the client. In response to the request, upon authorization for the server system (e.g., by File Transfer Authorization Module 124 in FIGS. 1 and 2) to receive the potentially malicious files from the client, the server system automatically receives (622) one or more potentially malicious files from the client, where transmission of the one or more potentially malicious files from the client to the server system was authorized (e.g., by security personnel such as a human system administrator or by an automated process at the computer system at Security Manager System 104) based on a confidentiality level of the potentially malicious files.

In some embodiments, authorization for the server system to receive a respective potentially malicious file from the client is (624) generated automatically at the client in accordance with a determination that predetermined authorization criteria are met for the respective potentially malicious file (e.g., the predetermined authorization criteria are met when the client determines that the respective potentially malicious file has an internal security rating below a predetermined threshold and/or is not from a storage location that is associated with particularly sensitive information). In some embodiments, the server system sends a request for a first potentially malicious file and second potentially malicious file to the client, and the client determines that the first potentially malicious file does not meet the authorization criteria and determines that the second potentially malicious file does meet the authorization criteria. In some embodiments, in response to the request for the first and second potentially malicious files, the server system automatically transmits (sends) the second potentially malicious file and blocks transmission of the first potentially malicious files. In some embodiments, potentially malicious files whose transmission was blocked are flagged for manual review by a user of the client (e.g., a file security manager at a corporate client reviews any potentially malicious files that have been identified as possibly including sensitive corporate information and the file security manager can make a final determination as to whether or not the blocked file includes sensitive corporate information).

In some embodiments, authorization for the server system to receive a respective potentially malicious file from the client is (626) generated manually at the client after review of the respective potentially malicious file by a user at the client (e.g., security personnel at the client review the respective potentially malicious file to determine that the respective potentially malicious file does not include sensitive client information before the potentially malicious file is sent to the server system for further analysis). In some embodiments, the user is provided with options for blocking transmission of the respective potentially malicious file to the server system if the user determines that the respective potentially malicious file includes sensitive information. In some embodiments, files at Customer Network 101 have different confidentiality levels and low confidentiality files (e.g., operating system files, public computer files) are automatically authorized to be transmitted to Security Server System 106 without human review; medium confidentiality files (e.g., user-generated data on employee computer systems that is not flagged as highly confidential and customer service documentation) are flagged for human review before being authorized to be transmitted to Security Server System 106; and highly confidential files (e.g., personnel files, financial data, and new product information) are prevented from being authorized to be transmitted to Security Server System 106 (e.g., regular security personnel are not authorized to transmit the highly confidential files outside of Customer Network 101 so as to prevent accidental leakage of confidential Customer Network 101 information, and a super-user or senior security personnel that has the authority to authorize transfer of highly confidential files outside of Customer Network 101).

After (628) receiving the one or more potentially malicious files, the server system analyzes (630) the potentially malicious files using threat-identification information available at the server system (e.g., the potentially malicious files are analyzed by a human security analyst or by an automated threat-identification process at the computer system).

In some embodiments, the client is one of a plurality of computers that are connected to a secured/non-public network (e.g., a local area network, an internal corporate network, or a portion of an internal corporate network), and analyzing the potentially malicious files includes (632) comparing information about the potentially malicious files to information about similar files on other computers that are connected to the same secured/non-public network to identify patterns of activity that correspond to the potentially malicious files. For example, the server system looks for patterns of activity that occur across a corporate network so as to identify malicious activity such as the rapid distribution of an unknown and potentially malicious file to multiple computers within the local area network or a larger corporate network (e.g., a plurality of computer systems in Customer Network 101) that provides additional evidence that the potentially malicious files are actually malicious files.

After analyzing the potentially malicious files provided by the client, the server system provides (634), to the client, an indication of the security status of the one or more potentially malicious files based on the analysis of the potentially malicious files. In some embodiments, the indication of the security status of the one or more potentially malicious files includes (636) an identification of a respective file of the one or more potentially malicious files as a malicious file. In some embodiments, the indication of the security status of the one or more potentially malicious files includes an updated set of malicious-file definitions.

It should be understood that the particular order in which the operations in FIGS. 6A-6B have been described are merely exemplary and are not intended to indicate that the described order is the only order in which the operations could be performed. One of ordinary skill in the art would recognize various ways to reorder the operations described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
    at a server system that includes one or more processors and memory:
        receiving, from a client, metadata for a plurality of suspicious files detected at the client, wherein the suspicious files are files for which the client was unable to conclusively determine a security status;
        analyzing the metadata using threat-identification information;
        identifying a subset of the suspicious files as potentially malicious files based on the results of the analysis;
        requesting authorization to receive the potentially malicious files from the client;
        in response to the request, upon authorization for the server system to receive the potentially malicious files from the client, automatically receiving one or more potentially malicious files from the client, wherein transmission of the one or more potentially malicious files from the client to the server system was authorized based on a confidentiality level of the potentially malicious files; and
        after receiving the one or more potentially malicious files:
            analyzing the potentially malicious files using threat-identification information available at the server system; and
            providing, to the client, an indication of the security status of the one or more potentially malicious files based on the analysis of the potentially malicious files.

2. The method of claim 1, wherein the plurality of suspicious files were identified at the client using a set of one or more heuristic models provided by the server system and implemented at the client.

3. The method of claim 2, including, prior to receiving the metadata from the client:
    providing, to the client, information about a plurality of heuristic models for identifying suspicious files;
    receiving, from the client, selection of the set of one or more heuristic models from the plurality of heuristic models; and
    providing, to the client, the set of one or more heuristic models selected by the client.

4. The method of claim 2, including, prior to receiving the metadata from the client:
    providing, to the client, a plurality of heuristic models; and
    providing, to the client, information that enables the client to select the set of one or more heuristic models from the plurality of heuristic models.

5. The method of claim 1, wherein:
    the client is one of a plurality of computers that are connected to a secured network; and
    analyzing the potentially malicious files includes comparing information about the potentially malicious files to information about similar files on other computers that are connected to the same secured network to identify patterns of activity that correspond to the potentially malicious files.

6. The method of claim 1, wherein the indication of the security status of the one or more potentially malicious files includes an identification of a respective file of the one or more potentially malicious files as a malicious file.

7. The method of claim 1, wherein authorization for the server system to receive a respective potentially malicious file from the client is generated automatically at the client in accordance with a determination that predetermined authorization criteria are met for the respective potentially malicious file.

8. The method of claim 1, wherein authorization for the server system to receive a respective potentially malicious file from the client is generated manually at the client after review of the respective potentially malicious file by a user at the client.

9. A server system, comprising:
    one or more processors;
    memory; and
    one or more programs, wherein the one or more programs are stored in the memory and configured to be executed by the one or more processors, the one or more programs including instructions for:
        receiving, from a client, metadata for a plurality of suspicious files detected at the client, wherein the suspicious files are files for which the client was unable to conclusively determine a security status;
        analyzing the metadata using threat-identification information;
        identifying a subset of the suspicious files as potentially malicious files based on the results of the analysis;
        requesting authorization to receive the potentially malicious files from the client;
        in response to the request, upon authorization for the server system to receive the potentially malicious files from the client, automatically receiving one or more potentially malicious files from the client, wherein transmission of the one or more potentially malicious files from the client to the server system was authorized based on a confidentiality level of the potentially malicious files; and
        after receiving the one or more potentially malicious files:
            analyzing the potentially malicious files using threat-identification information available at the server system; and
            providing, to the client, an indication of the security status of the one or more potentially malicious files based on the analysis of the potentially malicious files.

10. The server system of claim 9, wherein the plurality of suspicious files were identified at the client using a set of one or more heuristic models provided by the server system and implemented at the client.

11. The server system of claim 10, wherein the one or more programs comprise instructions for, prior to receiving the metadata from the client:
    providing, to the client, information about a plurality of heuristic models for identifying suspicious files;
    receiving, from the client, selection of the set of one or more heuristic models from the plurality of heuristic models; and providing, to the client, the set of one or more heuristic models selected by the client.

12. The server system of claim 10, wherein the one or more programs comprise instructions for, prior to receiving the metadata from the client:
providing, to the client, a plurality of heuristic models; and
providing, to the client, information that enables the client to select the set of one or more heuristic models from the plurality of heuristic models.

13. The server system of claim 9, wherein:
the client is one of a plurality of computers that are connected to a secured network; and
analyzing the potentially malicious files includes comparing information about the potentially malicious files to information about similar files on other computers that are connected to the same secured network to identify patterns of activity that correspond to the potentially malicious files.

14. The server system of claim 9, wherein the indication of the security status of the one or more potentially malicious files includes an identification of a respective file of the one or more potentially malicious files as a malicious file.

15. A non-transitory computer readable storage medium storing one or more programs, the one or more programs comprising instructions, which when executed by a computer system with one or more processors, cause the computer system to:
receiving, from a client, metadata for a plurality of suspicious files detected at the client, wherein the suspicious files are files for which the client was unable to conclusively determine a security status;
analyzing the metadata using threat-identification information;
identifying a subset of the suspicious files as potentially malicious files based on the results of the analysis;
requesting authorization to receive the potentially malicious files from the client;
in response to the request, upon authorization for the server system to receive the potentially malicious files from the client, automatically receiving one or more potentially malicious files from the client, wherein transmission of the one or more potentially malicious files from the client to the server system was authorized based on a confidentiality level of the potentially malicious files; and
after receiving the one or more potentially malicious files:
analyzing the potentially malicious files using threat-identification information available at the server system; and
providing, to the client, an indication of the security status of the one or more potentially malicious files based on the analysis of the potentially malicious files.

16. The non-transitory computer readable storage medium of claim 15, wherein the plurality of suspicious files were identified at the client using a set of one or more heuristic models provided by the server system and implemented at the client.

17. The non-transitory computer readable storage medium of claim 16, wherein the one or more programs comprise instructions which, when executed by the computer system, cause the computer system to, prior to receiving the metadata from the client:
provide, to the client, information about a plurality of heuristic models for identifying suspicious files;
receive, from the client, selection of the set of one or more heuristic models from the plurality of heuristic models; and
provide, to the client, the set of one or more heuristic models selected by the client.

18. The non-transitory computer readable storage medium of claim 16, wherein the one or more programs comprise instructions which, when executed by the computer system, cause the computer system to, prior to receiving the metadata from the client:
provide, to the client, a plurality of heuristic models; and
provide, to the client, information that enables the client to select the set of one or more heuristic models from the plurality of heuristic models.

19. The non-transitory computer readable storage medium of claim 15, wherein:
the client is one of a plurality of computers that are connected to a secured network; and
analyzing the potentially malicious files includes comparing information about the potentially malicious files to information about similar files on other computers that are connected to the same secured network to identify patterns of activity that correspond to the potentially malicious files.

20. The non-transitory computer readable storage medium of claim 15, wherein the indication of the security status of the one or more potentially malicious files includes an identification of a respective file of the one or more potentially malicious files as a malicious file.

* * * * *